United States Patent Office 2,992,272
Patented July 11, 1961

2,992,272
PREPARATION OF CARBONYL OLEFINS
Allan S. Hay, Watervliet, N.Y., assignor to General Electric Company, a corporation of New York
No Drawing. Filed Feb. 25, 1957, Ser. No. 641,842
16 Claims. (Cl. 260—533)

This invention relates to the oxidation of olefinic compounds having an aliphatic hydrocarbon group adjacent to the olefinic group (also referred to as "α-carbon olefins") and to the preparation of olefinic carbonyl compounds. More particularly, this invention relates to the preparation of an olefinic compound having a carbonyl group adjacent to the olefinic group (also referred to as "α-carbonyl olefins") by a process which comprises reacting oxygen with a solution of an α-carbon olefin, the solution also containing dissolved therein a catalyst which is a combination of cobalt, bromine, and a carboxylic acid, said cobalt being derived from divalent and trivalent cobalt compounds.

In organic synthesis it is a problem to preferentially oxidize one group of a compound which contains more than one oxidizable group. It is an even greater problem to oxidize one of these groups without reacting with another group which is normally more susceptible of oxidation than the group desired to be oxidized. Because of the great activity of the olefinic group, no general method for preparing α-carbonyl olefins by oxidizing the α-carbon group of an α-carbon olefin using oxygen as the oxidizing agent under moderate reaction conditions has been disclosed. Heretofore, a limited number of α-carbonyl olefins have been prepared from these compounds by oxidizing the α-carbon group with special oxidizing agents, such as selenium dioxide, chromic acid, etc.

Unexpectedly, I have now discovered a general process whereby an α-carbon olefin can be preferentially oxidized with oxygen or air at the α-carbon group instead of the olefinic group. This process which occurs at a rapid rate under moderate reaction conditions comprises reacting oxygen with an α-carbon olefin in a liquid phase also containing dissolved therein a catalyst which is a combination of cobalt, bromine and a carboxylic acid, said cobalt being derived from divalent and trivalent cobalt compounds. This reaction oxidizes terminal α-carbon groups to carboxylic acids and non-terminal α-carbon groups to ketones. Where the non-terminal α-carbon group, which is oxidized, is attached to oxygen, an ester or acid is formed.

The catalyst for this reaction is so unique and specific that the omission or substitution of one component renders it substantially inactive. Thus, the omission of bromine or the substitution of other closely related components, such as iron for cobalt, chlorine or iodine for bromine, etc., renders the catalyst inactive. The reaction takes place with such ease that when a reaction mixture containing cyclohexene, acetic acid, cobalt and bromine is left overnight at room temperature in contact with air, 1-cyclohexenone-3 is formed. This occurs despite the fact that air is not passed into the reaction mixture and no special equipment is employed.

In carrying out the process of the present invention, an α-carbon olefin, a suitable solvent, which preferably is a carboxylic acid, such as acetic or propionic acids, and the catalyst containing cobalt, bromine, and a carboxylic acid (also referred to as the "cobalt-bromine-carboxylic catalyst" or "catalyst") are added to a suitable reaction vessel and heated to the reaction temperature. Oxygen is then passed into the reaction mixture at the desired rate for the desired period of time. After the reaction is completed, the α-carbonyl olefin produced is separated from the reaction mixture by conventional methods. The process can also be carried out in a continuous manner by continuously adding both the α-carbon olefin and oxygen to a solution of the cobalt-bromide-carboxylic catalyst in a solvent. Alternately, a part of the catalyst can be present in one part of the system while the other part of the catalyst is added with a reactant. Thus, the cobalt portion can be present in acetic acid and the bromine portion added with the α-carbon olefin compound. By reusing the mother liquid of a prior run in a subsequent run, one can continuously reuse the catalyst.

The term "α-carbon olefin" as used in the present invention comprises organic compounds containing a methyl ($CH_3$—), a methylene (—$CH_2$—) or a methenyl ($CH\equiv$) group adjacent to an olefinic group. The term is thus seen to include olefinic hydrocarbons containing at least one

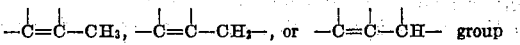

These groups may be described as olefins having a saturated α-carbon atom with at least one hydrogen attached thereto. All of these groups may be attached to or be part of an aliphatic group, a cycloaliphatic group, an aryl group, etc. In addition to hydrocarbon materials the term also includes α-carbon olefins containing other elements besides carbon and hydrogen, for example, oxygen, halogens, sulfur, etc. Thus, the term includes compounds of the formula

I

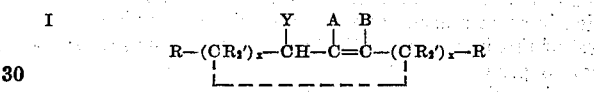

where $x$ is zero or a whole number, for example 1–10 or higher, R′ and Y are selected from the group consisting of hydrogen, a hydrocarbon radical, for example, alkyl, cycloalkyl, aryl, etc. radicals; A and B are selected from the group consisting of R′ and halogens, for example, chlorine, bromine, fluorine; and R is selected from the group consisting of R′, a carboxylic acid radical, an ester thereof, an alcohol radical (hydroxyl radical), an ester thereof; an ether radical, a carbonyl radical, etc. These groups may also contain halogens, for example, bromine, e.g., the bromophenyl radical, etc. Those compounds wherein Y is hydrogen may be described as olefins having a saturated α-carbon atom with at least 2 hydrogens attached thereto. The dotted line indicates that the olefin may be open chain (i.e. aliphatic) or cyclic, i.e. cycloaliphatic. It will be evident that when the compound is a cycloaliphatic the specific carbon atoms which join together to form the ring will have one less R′ group than the formula shows for the straight chain aliphatic.

By the process of the present invention, it is possible to prepare various kinds of α-carbonyl olefins containing at least one

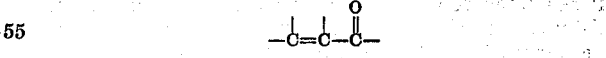

group including olefinic carboxylic acids, esters, anhydrides, ketones, etc., depending on whether the α-carbon group is terminal or not and whether the non-terminal α-carbon group is attached to oxygen. For example, when octene-1 is oxidized the product is ketonic, i.e. 1-octenone-3. Where 2,4,4-trimethylpentene-2 is oxidized, the product is carboxylic, i.e. β-tert-butyl methacrylic acid. Where both terminal and non-terminal α-carbon groups are present, both ketones and carboxylic acids may be formed, the predominant product depending on the specific olefinic oxidized. Thus, where heptene-2 is oxidized, a mixture of β-propionyl acrylic acid, 2-hexenoic acid, and 2-heptene-4-one is possible, although the latter is the predominant product. In some instances esters and carboxylic anhydrides rather than ketones are formed even though the α-carbon group is not terminal. For example, where the α-carbon group is joined to an alkoxy group through oxygen, an ester is formed; where the α-carbon group is joined to an oxygen of an ester group, the product is a carboxylic acid anhydride.

By the process of the present invention, it is possible to prepare acrylic acid from propylene, 1-butenone-3 from butylene-1, 1-pentenone-3 from pentylene-1, and corresponding acids and ketones from homologues and isomers of these olefins; 1-cyclohexenone-3 from cyclohexene, 1-methylcyclohexenone-3 from 1-methylcyclohexene, and corresponding ketones from homologues and isomers of these cycloaliphatic olefins; vinylphenone from allyl benzene, vinyl p-bromo-phenone from allyl p-bromobenzene, vinyl naphthyl ketone from allyl naphthalene; hexen-4-one-3-oic acid or esters thereof from hexen-4-oic acid or esters thereof, p-propenoyl benzoic acid or esters thereof from p-allyl benzoic acids or esters thereof, the methyl ester of acrylic acid from methyl allyl ether, acrylic acid from allyl alcohol, and the like. Where Y in Formula I is a group other than hydrogen, cleavage or rearrangement occurs to form a carbonyl group. It should be understood that where the compound to be oxidized contains aralkyl or alkyl-substituted aralkyl groups that these groups will be oxidized to the corresponding carbonyl compounds described in my applications Serial No. 641,845 and Serial No. 641,843, filed concurrently herewith and assigned to the same assignee as the present application.

Although I do not wish to be bound by theory, it is believed that cobalt, bromine and carboxylic acid combine in some unusual manner to produce the unique catalyst of this invention. All of these components are essential to produce an active catalyst. The combination is so unique that the substitution of other elements for each or both components either totally stops or substantially impedes the reaction. Thus, little catalytic action is obtained when other elements which usually make excellent oxidation catalysts are present during the reaction. For example, the presence of appreciable amounts of iron, copper, etc. in the reaction mixture substantially stops the reaction. Similarly, the presence of appreciable amounts of anions, such as sulfate, nitrate, chlorate, etc. ions inhibit the activity of this unique catalyst. The substitution of other halogens, such as chlorine for bromine, imparts to the catalyst no appreciably greater catalytic activity, than is found in cobalt acetate itself. The presence of iodine completely inactivates the catalyst. In marked contrast to the substantially similar reaction rate constants obtained with either cobalt and acetic acid or cobalt, acetic acid and chlorine, a catalyst comprising cobalt, acetic acid and bromine has a reaction rate 250–300 times as great.

The molar ratio of cobalt to bromine (calculated as monatomic bromine, Br atomic weight 79.916), more frequently called the atomic ratio, is important for maximum reaction rates. Optimum reaction rates are obtained when cobalt and bromine are present in substantially equiatomic amounts (i.e. 0.9–1.1 atoms of bromine per atom of cobalt). The rate of reaction decreases rapidly as the bromine-to-cobalt atomic ratio is increased, and conversely, as the bromine-to-cobalt atomic ratio is decreased from unity there is a decrease in activity although this decrease is less marked. I have found that a bromine-to-cobalt atomic ratio of 2 substantially stops the reaction and that the reaction proceeds even at as low a ratio as 0.008. Although in practice I have advantageously employed bromine-to-cobalt atomic ratios of about 0.3 to 1, atomic ratios of about 0.1 to 1.2 also give satisfactory results. However, atomic ratios of 0.008 to 1.9 can also be employed. Although an initial bromine-to-cobalt atomic ratio of 2 substantially stops the reaction, bromine losses may occur during the reaction or during a continuous or a multi-cycle reaction wherein the mother liquor is continuously reused, thus permitting the addition of more bromine, if desired. However, the catalytically effective atomic ratio should not be greater than 2.

The molar ratio of the carboxylic acid to cobalt has no upper limit with the result that carboxylic acids can be employed as solvents for the reaction. Although small amounts of carboxylic acids can be used to effect oxidation, for example in a molar ratio of about 2:1 in respect to cobalt, for optimum yields and rates, it is preferable to employ larger amounts of carboxylic acid, preferably in solvent quantities.

The cobalt portion of the catalyst is furnished by cobalt compounds in the divalent or trivalent state. Specific compounds include cobalt salts of carboxylic acids and cobalt bromide. Where the reaction is carried out in the presence of a large amount of a carboxylic acid, for example, acetic acid, cobalt, regardless of its initial form, generally takes the form of the acetate in the reaction mixture. Therefore, any cobalt salt of the type described which is soluble in the solvent employed in an amount sufficient to form the catalyst is satisfactory for the process. The preferred source of cobalt is cobaltous acetate tetrahydrate (also referred to as "Co(OAc)$_2$.4H$_2$O"). However, other suitable cobalt catalysts include the cobaltous salts of other lower aliphatic acids, such as, for example, cobaltous propionate, cobaltous butyrate, etc. In addition, cobaltous salts of aromatic carboxylic acids may also be employed as catalysts. Thus, I can employ salts such as cobaltous benzoate, cobaltous toluate, cobaltous terephthalate, cobaltous napthalene carboxylate, etc. Cobalt salts of anions that inactivate the catalyst should be avoided, for example, cobalt salts containing sulfate, nitrate, iodide, iodate, chlorate, etc. ions.

The bromine portion of the catalyst is generally furnished by bromine compounds containing bromine capable of being readily removed from the parent compound. Specific compounds include the bromocarboxylic acids, for example, the bromoaliphatic acids, e.g., the bromoacetic acids, the bromopropionic acids, the bromobutyric acids, etc., cycloaliphatic carboxylic acids containing removable bromine, for example, α-bromocyclohexanecarboxylic acid, etc.; free bromine (i.e. Br$_2$); bromocarbons containing removable bromines, for example, bromochloroform, etc.; hydrogen bromide, cobalt bromide, etc. I have found that the addition of about one mole of HBr per mole of cobalt acetate produces an extremely active catalyst.

The carboxylic acid portion of the catalyst is generally furnished by carboxylic acids or salts of carboxylic acids. Examples of carboxylic acids and salts comprise those carboxylic acids hereafter mentioned as solvents and the previously mentioned cobalt salts containing carboxyl groups. Other sources of the carboxylic acid portion of the catalyst comprise compounds capable of forming carboxylic acids in situ even in very small amounts.

A wide variety of solvents may be employed in the reaction with maximum yields being obtained with inert solvents which do not adversely affect the reaction and in which both reactant and catalyst are soluble. Because carboxylic acids make excellent solvents for both the reactant and catalyst, they are the preferred solvents. Since carboxylic acids form part of the catalyst and there is no upper limit to the amount of carboxylic acid the reaction will tolerate, these solvents can be used as the source of the carboxylic acid portion of the catalyst as well as the solvent. For obvious reasons, it is highly desirable to use a liquid carboxylic acid although solid carboxylic acids can be used in conjunction with other solvents or under liquefying conditions. Thus, benzoic acid dissolved in benzene has been used as a combined solvent and source of the carboxylic acid portion of the catalyst. Soluble, liquid, or liquefiable products of the oxidation can be used as solvents in the reaction so that separation steps are minimized. Examples of carboxylic acids comprise aliphatic carboxylic acids, for example, acetic, propionic, butyric, etc. acids, cycloaliphatic carboxylic acids, for example, naphthenic acid, cyclohexanecarboxylic acids, etc. In addition, carboxylic acid precursors, such as carboxylic acid anhydride, for example, acetic anhydride, etc. can also be employed. These anhydrides can serve as solvents and as a means of removing water and can furnish the carboxylic acid necessary for the catalyst. Mixtures of these acids with other solvents can also be employed, for example, mixtures of acetic acid with benzene, etc. As a class, the lower aliphatic carboxylic acids are preferred as solvents. The specific carboxylic acids preferred are acetic and propionic acids.

The rate of oxygen addition to the reaction is also not critical and may vary within any desired limits. Since the function of the oxygen is to oxidize the α-carbon group of the olefin to a carbonyl group, the rate of reaction is dependent to some extent on the amount of oxygen present at any given time in the area of the reaction mixture. Thus, the rate of reaction is faster with higher rates of oxygen addition than with lower rates of addition. Satisfactory results have been obtained adding oxygen to the reaction mixture at the rate of from 0.01 to 10, and preferably from 0.5 to 5 parts by weight of oxygen per hour per part of the α-carbon olefin. It should be understood that in addition to employing pure oxygen as the oxidizing agent in my process, it is also possible to employ any oxygen-containing gas in which the ingredient other than oxygen is inert under the conditions of the reaction. Thus, satisfactory results have been obtained employing air instead of pure oxygen in the feed gas to the reaction. In addition, the reaction proceeds satisfactorily employing mixtures of oxygen and inert gases, such as helium, neon, xenon, krypton, argon, etc. as diluents for the oxygen in the feed gas. However, in the preferred embodiment of my invention I employ either pure oxygen or air as the oxidizing agent.

The temperature of the reaction may vary within fairly wide limits, although satisfactory results are obtained with temperatures as low as room temperature (i.e. about 25° C.), reaction below about 50° C., proceeds at a slower rate than at higher temperatures, such as from 100 to 160° C. However, I have found that the optimum temperature varies with the specific olefin oxidized. Because some olefins are sensitive to heat or their initial products are either further oxidized to undesired compounds or are susceptible of polymerization or condensation, it may be desirable to employ lower temperatures. However, where there is no problem of sensitive reactants or products, I prefer to carry out the reaction at the reflux temperature of the reaction mixture. Where the reaction mixture contains a large amount of acetic acid as a solvent, and this acid is the lowest boiling major constituent of the reaction mixture, it is found that the reflux temperature is near the boiling point at atmospheric pressure of the acid, i.e. about 110–115° C.

Although the process of this invention proceeds at a rapid rate at atmospheric pressure, with certain olefins it may be desirable to employ subatmospheric or superatmospheric pressures. Because of the low boiling points of some olefins, it may be desirable to use superatmospheric pressure to increase reaction time and/or temperature. Where ketones or acids are formed which are capable of further reaction, for example by further oxidation, condensation or polymerization, it may be advantageous to use subatmospheric pressure to remove the products as fast as they are formed.

In the oxidation of the α-carbon group to a carbonyl group one of the products of reaction is water. In carrying out the reaction it is found that the presence of a large amount of water has an adverse effect on the rate of reaction. Thus, when an amount of water in excess of about 0.05 part by weight per part of solvent is allowed to accumulate the reaction is substantially stopped. Therefore, I prefer to carry out the reaction under nearly anhydrous conditions and with a maximum of about 0.05 part water per part solvent. Minute traces of water are often desirable since these help solubilize $Co(OAc)_2$. Thus, $Co(OAc)_2 \cdot 4H_2O$ is extremely soluble in acetic acid while anhydrous $Co(OAc)_2$ is only slightly soluble. However, anhydrous $Co(OAc)_2$ is quite soluble in acetic acid when HBr is present. The removal of water during the reaction is readily accomplished by allowing the water to distill from the reaction mixture as it is formed. The effect of water can also be minimized by keeping the ratio of olefin to solvent low. Azeotroping agents, such as benzene, heptane, etc. can also be used in removing water from the reaction mixture. In addition, carboxylic acid anhydrides can be used as a means of removing water.

The catalyst will be effective in the oxidation of the α-carbon olefin regardless of the amount present in the reaction mixture at any given time. However, since oxidation is extremely rapid and water is a product of the reaction, a controlling factor on the rate of oxidation is the rate at which water is removed. Any amount of α-carbon olefin can be present during the reaction provided the water content of the reaction mixture is below 0.05 part per part of solvent. In practice, I have obtained satisfactory results when employing in the starting mixture from 0.01 to 0.5 part by weight of the α-carbon olefin per part of solvent. Preferably my reaction mixture at the start contains from 0.02 to 0.3 part by weight of the α-carbon olefin per part of solvent. It is obvious that the ratio of α-carbon olefin to solvent will vary during the course of the reaction since the α-carbon olefin is being continuously oxidized to the corresponding ketone or carboxylic acid. Slow addition of the α-carbon olefin to the reaction mixture is one method of keeping the water content low.

The following examples are illustrative of the practice of my invention and are not intended for purposes of limitation. In the examples all parts are by weight unless stated otherwise.

These examples were carried out according to the following general procedure. An α-carbon olefin and a solvent containing the catalyst were placed in a suitable reaction vessel which was brought to reaction temperature and stirred rapidly. At this time oxygen was passed into the reaction mixture. Except in those examples in which the reaction was carried out below about 100° C. or where acetic anhydride was used as a means of removing water, water formed by the oxidation of the α-carbon olefin was removed from the reaction system by distillation during the course of the reaction.

Specific variations from these procedures are indicated in the specific example. Glacial acetic acid was used in the examples. The molality of bromine moiety of the catalyst was calculated as monatomic bromine (Br, atomic weight 79.916). The compounds in bracket ([ ]) indicate the source of the catalyst.

The products of the invention were isolated by conventional techniques. In general, where the product was insoluble in the cooled reaction mixture, it was removed by filtration. The products in the mother liquor were isolated by diluting the reaction mixture with water, extracting the aqueous solution with ether to remove carboxylic acids and ketones, extracting the ether solution with a dilute aqueous basic solution to transfer the carboxylic acid product to the basic aqueous solution and separating the ketones from the ether solution by conventional techniques, such as by distillation, by forming suitable derivatives, for example, the 2,4-dinitrophenylhydrazone, etc. Where one does not desire to separate carboxylic acids from the ether solution, the basic wash is omitted. Alternately, the reaction products can be isolated solely by filtration and distillation.

*Example 1*

This example illustrates the oxidation of an olefin having a terminal olefinic group and the fact that the oxidation takes place at about room temperature.

Oxygen was passed into a reaction mixture of 72 parts of octene-1 and 425 parts of acetic acid, the acetic acid being 0.15 molal in respect to both cobalt and bromine [Co(OAc)$_2$.4H$_2$O and CoBr$_2$.6H$_2$O], for 2.3 hours at the rate of 85 grams per hour. During the course of the reaction the temperature was maintained between 25° C. and 36° C. with no distillate being removed during the course of the reaction. The starting material was oxidized to 1-octenone-3,

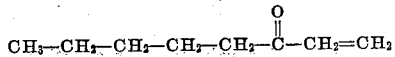

which was separated from the reaction mixture by pouring the reaction product in water, extracting with ether, washing the ether extract with dilute aqueous potassium carbonate, drying, and separating the product by distillation.

Example 2

This example illustrates the preparation of a carboxylic acid by oxidizing a branched olefin having a terminal α-carbon group.

A reaction mixture of 45.6 parts of 2,4,4-trimethyl pentene-2 and 370 parts of acetic acid, the acetic acid being .22 molal in respect to both cobalt and bromine [Co(OAc)$_2$.4H$_2$O and HBr], was heated to 80° C. as oxygen at the rate of 43 parts per hour was passed into the reaction mixture for 1.25 hours. During the course of the reaction the temperature rose from 80–100° C. with no distillate being removed during the course of the reaction. The starting material was oxidized to β-tertiary butyl methacrylic acid,

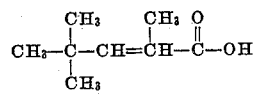

which was separated from the reaction mixture by pouring into water, extracting with ether, washing the ether extract with water, drying and separating the product by distillation.

Example 3

This example illustrates the preparation of a carboxylic acid by oxidizing an olefin having a terminal α-carbon group. This example also illustrates the use of acetic anhydride as a means of removing water.

A reaction mixture of 112 parts of 2,4,4-trimethyl pentene-2 and 300 parts of acetic acid, the acetic acid being 0.2 molal in respect to both cobalt and bromine [Co(OAc)$_2$.4H$_2$O and CoBr$_2$.6H$_2$O], was heated to 80° C. without removing any distillate as oxygen at the rate of 51 parts per hour was passed into the reaction mixture for 3 hours. During the course of the reaction 50 parts of acetic acid anhydride was added to remove the water formed by the oxidation. The starting material was oxidized to β-tertiary butyl methacrylic acid,

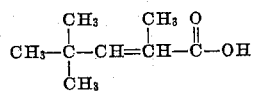

which was separated from the reaction mixture in the manner of Example 2.

Example 4

This example illustrates the preparation of a ketone by oxidizing an olefin having a terminal as well as a non-terminal α-carbon group. The example also illustrates that the chief product formed (i.e. whether it be ketonic or carboxylic) will depend on the specific compound oxidized.

To 525 parts of acetic acid, the acetic acid being 0.1 molal in respect to cobalt and .03 molal in respect to bromine [Co(OAc)$_2$.4H$_2$O and CoBr$_2$.6H$_2$O], heated to reflux was added 25 parts of heptene-2 dissolved in 50 parts of acetic acid over a period of 1 hour. Oxygen was continuously passed into the reaction mixture during this addition at the rate of 68 parts per hour. The starting material was oxidized to 2-heptene-4-one,

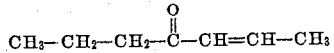

which was separated from the reaction mixture in the manner of Example 1.

Example 5

This example also illustrates the oxidation of an olefin containing a terminal as well as a non-terminal α-carbon group and the fact that reaction proceeds at a low temperature.

Oxygen was passed into a reaction mixture of 72 parts of octene-2 and 420 parts of acetic acid, the acetic acid being 0.2 molal in respect to cobalt and 0.15 molal in respect to bromine [Co(OAc)$_2$.4H$_2$O and HBr], for 2 hours at the rate of 85 grams per hour. During the course of the reaction the temperature rose from 25 to 41° C. with no distillate being removed from the reaction mixture.

The starting material was oxidized to 2-octene-one-4,

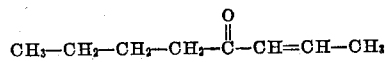

which was separated from the reaction mixture in the manner of Example 1.

Example 6

This example illustrates the oxidation of an α-carbon olefin containing an aromatic group.

A reaction mixture of 26.4 parts of 1-phenylbutene-2 and 105 parts of acetic acid, the acetic acid being 0.2 molal in respect to both cobalt and bromine

[Co(OAc)$_2$.4H$_2$O and HBr]

was heated to 50° C. as oxygen at the rate of 68 parts per hour was passed into the reaction mixture over a period of one hour. During the course of the reaction the temperature rose from 50° to 105° C., no distillate being removed during the course of the reaction. The starting material was oxidized to crotonophenone

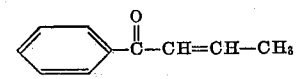

which was separated from the reaction mixture in the manner of Example 1.

Example 7

This example illustrates the oxidation of an α-carbon olefin which is part of a cycloaliphatic ring and the use of a solvent containing heptane and acetic acid.

To a solvent containing 34 parts of heptane and 210 parts of acetic acid, the solvent being 0.5 molal in respect to both cobalt and bromine [Co(OAc)$_2$.4H$_2$O and CoBr$_2$.6H$_2$O], heated to 95° C. was added 50 parts of cyclohexene over a period of ¾ hour. Oxygen was continuously passed into the reaction mixture during this addition at the rate of 51 parts/hour with distillate being removed during the course of the reaction. The starting material was oxidized to 1-cyclohexenone-3

which was separated from the reaction mixture by distilling the reaction mixture and separating the 1-cyclohexenone-3 fraction.

Example 8

This example illustrates the oxidation of an α-carbon olefin which is part of a cycloaliphatic ring and the use of a solvent containing benzene and caprylic acid.

To a solution containing 200 parts of benzene and 170 parts of caprylic acid, the solution being 0.22 molal in respect to both cobalt and bromine [$Co(OAc)_2 \cdot 4H_2O$ and $CoBr_2 \cdot 6H_2O$], heated to reflux was added 300 parts of cyclohexene. Oxygen was passed into the reaction mixture at the rate of 102 parts/hour during this addition and thereafter for a total of 7 hours, with the distillate being removed during the course of the reaction. The starting material was oxidized to 1-cyclohexenone-3 which was removed from the reaction mixture in the manner of Example 7.

Although the foregoing examples have described a number of α-carbon olefins and variations and modifications of the preparations of ingredients and reaction conditions which may be employed in the practice of the present invention, it should be understood that my reaction is also applicable to reactants, reaction conditions, and proportions of ingredients which are not specifically illustrated by the examples.

The olefinic carbonyl compounds prepared by the method of this invention exhibit the same utility as the same compounds prepared by any other method. Thus, these compounds may be homo- or copolymerized to polyvinyl polymers which are useful in the preparation of containers, pipes, electrical insulations, etc. The higher molecular weight ketones may be used in perfumes.

From the foregoing, it is evident that a general, unique and versatile oxidation process has been described. The foregoing detailed description has been given for clearness of understanding only and no unnecessary limitations are to be understood therefrom. The invention is not limited to the exact details shown and described for obvious modifications will occur to those skilled in the art. For example, although the oxidation generally requires no external initiation from ozone, peroxide, hydroperoxide, etc. the use of these expedients is not precluded. Furthermore, it is obvious that my process is applicable to continuous operation, the products formed being separated by continuous distillation.

What I claim as new and desire to secure by Letters Patent of the United States is:

1. The process of producing an olefinic carbonyl compound which comprises reacting oxygen with an olefinic hydrocarbon having a saturated α-carbon atom with at least one hydrogen attached thereto, adjacent to the olefinic group, said olefinic hydrocarbon being oxidized while dissolved in a liquid solvent in which the water concentration is maintained at no more than 5 percent by weight, the solvent also containing in solution a catalyst consisting essentially of a combination of cobalt, bromine and a carboxylic acid in which the bromine-to-cobalt atomic ratio is about 0.008 to 1.9 atoms of bromine per atom of cobalt, said cobalt being derived from divalent and trivalent cobalt salts.

2. The process of claim 1 in which a lower aliphatic carboxylic acid is employed as solvent.

3. The process of claim 2 in which the carboxylic acid solvent is selected from the group consisting of acetic and propionic acids.

4. The process of producing an olefinic carbonyl compound which comprises reacting oxygen with an olefinic hydrocarbon having a saturated α-carbon atom with at least one hydrogen attached thereto, adjacent to the olefinic group, said olefinic hydrocarbon being oxidized while dissolved in a liquid solvent in which the water concentration is maintained at no more than 5 percent by weight, the solvent also containing in solution a catalyst consisting essentially of a combination of cobalt, bromine and a carboxylic acid in which the bromine-to-cobalt atomic ratio is about 0.1 to 1.2 atoms of bromine per atom of cobalt, said cobalt being derived from divalent and trivalent cobalt salts.

5. The process of claim 4 in which a lower aliphatic carboxylic acid is employed as solvent.

6. The process of claim 5 in which the carboxylic acid solvent is selected from the group consisting of acetic and propionic acids.

7. The process of producing an olefinic carbonyl compound which comprises reacting oxygen with an olefinic hydrocarbon having a saturated α-carbon atom with at least one hydrogen attached thereto, adjacent to the olefinic group, said olefinic hydrocarbon being oxidized while dissolved in a liquid solvent in which the water concentration is maintained at no more than 5 percent by weight, the solvent also containing in solution a catalyst consisting essentially of a combination of cobalt, bromine and a carboxylic acid in which the bromine-to-cobalt atomic ratio is about 0.008 to 1.9 atoms of bromine per atom of cobalt, said cobalt being derived from divalent and trivalent cobalt salts of hydrobromic and carboxylic acids.

8. The process of producing an olefinic carbonyl compound which comprises reacting oxygen with an olefinic hydrocarbon having a saturated α-carbon atom with at least one hydrogen attached thereto, adjacent to the olefinic group, said olefinic hydrocarbon being oxidized while dissolved in a liquid solvent in which the water concentration is maintained at no more than 5 percent by weight, the solvent also containing in solution a catalyst consisting essentially of a combination of cobalt, bromine and a carboxylic acid in which the bromine-to-cobalt atomic ratio is about 0.1 to 1.2 atoms of bromine per atom of cobalt, said cobalt being derived from divalent and trivalent cobalt salts of hydrobromic and carboxylic acids.

9. The process of producing an olefinic carbonyl compound which comprises reacting oxygen with an olefinic hydrocarbon having a saturated α-carbon atom with at least one hydrogen attached thereto, adjacent to the olefinic group, said olefinic hydrocarbon being oxidized while dissolved in a liquid solvent in which the water concentration is maintained at no more than 5 percent by weight, the solvent also containing in solution a catalyst consisting essentially of a combination of cobalt, bromine and a carboxylic acid in which the bromine-to-cobalt atomic ratio is about 0.1 to 1.2 atoms of bromine per atom of cobalt, said cobalt being derived from a cobalt salt selected from the group consisting of cobalt acetate and mixtures of cobalt acetate with cobalt bromide, and said bromine being derived from a bromine compound selected from the group consisting of bromine, hydrogen bromide and cobalt bromide.

10. The process of claim 9 in which a member selected from the group consisting of acetic and propionic acids is employed as solvent.

11. The process of claim 9 in which the olefinic hydrocarbon is an aralkene hydrocarbon.

12. The process of claim 11 in which the aralkene hydrocarbon is 1-phenylbutene-2.

13. The process of claim 9 in which the olefinic hydrocarbon is a cycloalkene hydrocarbon.

14. The process of claim 13 in which the hydrocarbon is cyclohexene.

15. The process of producing an olefinic carbonyl compound which comprises reacting oxygen with an olefinic hydrocarbon having a saturated α-carbon atom with at least two hydrogens attached thereto, adjacent to the olefinic group, said olefinic hydrocarbon being oxidized while dissolved in a liquid solvent in which the water concentration is maintained at no more than 5 percent by weight, the solvent also containing in solution a catalyst consisting essentially of a combination of cobalt, bromine and a carboxylic acid in which the bromine-to-cobalt atomic ratio is about 0.1 to 1.2 atoms of bromine per atom of cobalt, said cobalt being derived from a cobalt salt selected from the group consisting of cobalt acetate and mixtures of cobalt acetate with cobalt bromide, and said bromine being derived from a bromine compound selected from the group consisting of bromine, hydrogen bromide and cobalt bromide.

16. The process of claim 15 in which the olefinic hydrocarbon is selected from the group consisting of pentene-2, 2,4,4-trimethylpentene-2, heptene-2, octene-1, and octene-2.

References Cited in the file of this patent

UNITED STATES PATENTS

| | | |
|---|---|---|
| 2,223,494 | Loder | Dec. 3, 1940 |
| 2,369,182 | Rust et al. | Feb. 13, 1945 |
| 2,391,740 | Raley et al. | Dec. 25, 1945 |
| 2,444,924 | Farkas et al. | July 13, 1948 |
| 2,678,338 | Linn | May 11, 1954 |
| 2,833,816 | Saffer et al. | May 6, 1958 |